United States Patent Office 3,812,158
Patented May 21, 1974

3,812,158
PREPARATION OF DIHYDROFURAN FROM 3,4-EPOXY-1-BUTENE, 3,4 - DIHYDROXY-1-BUTENE, OR 1,4-DIHYDROXY-2-BUTENE
Alfio J. Besozzi, Stone D. Cooley, and Fred E. Potts III, Houston, Tex., assignors to Petro-Tex Chemical Corporation, Houston, Tex.
No Drawing. Filed Dec. 17, 1970, Ser. No. 99,278
Int. Cl. C07d 5/08
U.S. Cl. 260—346.1 R          15 Claims

ABSTRACT OF THE DISCLOSURE 2,5-dihydrofuran is prepared by contacting 3,4-epoxy-1-butene, 3,4-dihydroxy-1-butene or 1,4-dihydroxy-2-butene with soluble mercury salt such as $HgSO_4$ in a hydroxylic solvent (e.g. water or butanol) which is neutral or acidic at a moderate temperature, e.g., 20 to 110° C. Yields as high as 33 mole percent based on the starting material charged have been achieved.

---

This invention relates to the production of dihydrofuran from 3,4-epoxy-1-butene(butadiene monoxide) and the hydrated analogues thereof. More specifically the invention relates to a process for the production of dihydrofuran in liquid phase in the presence of a soluble mercury salt.

Briefly stated, the present invention is a process for the preparation of dihydrofuran comprising contacting 3,4-epoxy-1-butene, 3,4-dihydroxy-1-butene, 1,4-dihydroxy-2-butene or mixtures thereof with a soluble mercury salt in a hydroxylic solvent in liquid phase at a temperature in the range of 5 to 150° C.

The solvent is a hydroxylic material. By this term is meant a material which contains at least one hydroxyl group, for example water, saturated alcohols, ether alcohols, organic acids and the like. The organic alcohols, ether alcohols and acids have about 1 to 20 carbon atoms and are usually saturated, that is, they contain no ethylenic unsaturation so as not to contain reactive sites which might cause the solvent to compete in the reaction. They may, however, be acyclic, cyclic, or aromatic so long as they are in liquid phase under the conditions of the reaction. The hydroxylic solvent can be a mixture of materials, e.g., water and butanol. The solvent is maintained in the liquid phase. Thus in the case of some solvents within the temperature range of 5 to 150° C. it will be necessary to use a pressurized system. Generally the pressure employed will be atmospheric or that sufficient to maintain the liquid phase during the reaction. However, some advantages may be gained by operating at super atmospheric pressures beyond those necessary to maintain the liquid phase. Usually pressures of 1 to 50 atmospheres will be employed. Water has been found to be a preferred solvent. Some other suitable solvents are, methanol, ethanol, butanol, propanol, hexanol, ethylene glycol, glycerol, propylene glycol, pentaerythritol, xylitol, sorbitol, diethylene glycol, dipropylene glycol, ethylene propylene glycol, acetic acid, propionic acid, benzoic acid and the like. A preferred group of solvents is water, methanol ethanol, butanol, ethylene glycol, propylene glycol or mixtures thereof. In a preferred embodiment the solvent is acidic, that is, the pH is less than 7, preferably about 0 to 7. In addition to water the lower monohydroxy alcohols i.e., 1 to 6 carbon atoms are preferred.

The reaction has been found not to proceed in a basic medium. On the other hand the addition of acid or acidic material is not necessary. Thus the condition of the reaction medium is non-basic, i.e., neutral or acidic. The system can be made acidic by the addition of organic or inorganic acids, for example, HCl, $H_2SO_4$, $HNO_3$, acetic acid, propionic acid, benzoic acid or by the addition of acidic compounds such as acid phosphates, e.g., $NaH_2PO_4 \cdot H_2O$, $Na_2HPO_4 \cdot 7H_2O$, $BF_3$-ether complexes and so forth.

The reaction can be carried out over a wide temperature range, i.e., 5 to 150° C. however, lower temperatures than the maximum tend to favor the reaction and a preferred range is about 20 to 110° C. Reaction times generally run from about 15 min. to 4 hrs., although lower temperatures may require longer reactions.

The soluble mercury salts include mercury (II) sulfate, mercury (II) chloride, mercury (II) acetate, mercury (II) nitrate, mercury (I) chlorate, mercury (I) chromate, mercury (II) chromate, mercury (II) fulminate, mercury (I) acetate and the like. Other mercury compounds which form soluble salts or compounds with the solvent or a component of the solvent such as mercury II oxide with sulfuric acid (mercury (II) sulfate) can be employed. The mercury salt can be employed over a wide range, generally in a range of about 1 to 70 weight percent based on the weight of oxirane or diol starting material, preferably about 10 to 50 weight percent on the same basis. The dihydrofuran can be separated from the reaction mixture by distillation, neat crystallization, solvent extraction or combinations of these conventional methods. The process is adapted to be run continuously or batchwise using conventional equipment.

Dihydrofuran is principally useful as a commercial chemical intermediate. Generally furan and furan type compounds are a highly desirable product which are widely used as a chemical intermediate employed on a large industrial scale. For example, furan can be prepared from dihydrofuran by a dehydrogenation as described in Belskii, Shuikin and Karakhanov, Doklady Akad. Nauk. S.S.S.R., 132, pp. 585–6 (1960). Dihydrofuran can be easily hydrogenated to tetrahydrofuran by a procedure such as that shown in U.S. Pat. 3,021,342 or British Pat. 851,692. Tetrahydrofuran is used in the preparation of spandex type fibers. Tetrahydrofuran is also a very good industrial solvent, particularly for polyvinyl chloride.

In the following examples quantitative analysis for dihydrofuran was carried out by gas-liquid chromatography. Standard solutions of dihydrofuran were made up to obtain the necessary factors. Benzene was employed as internal standard. The following examples are illustrative of the invention and are not intended to limit its scope. The yields of recovered dihydrofuran are reported as mole percent based on the amount of starting material charged to the reactor.

EXAMPLE 1

The reaction was carried out in a 100 ml. flask equipped with a magnetic stirrer, heating mantle and ice water cooled distillation condenser, to which was added 12.6 grams of 3,4-dihydroxy-1-butene, 1.5 grams of $HgSO_4$ and 50 ml. of water. The temperature was maintained at 100° C. Distillate was collected until GLC showed no further dihydrofuran was being produced (about 30 minutes). The distillate was saturated with NaCl and extracted with ether and the ether extracts analyzed. The yield of 2,5-dihydrofuran (DHF) was 2.1 grams or 21%.

EXAMPLE 2

The same apparatus and procedure of Example 1 were used. Ten grams of 3,4-epoxy-1-butene, 1.0 gram $HgSO_4$, ½ ml. of boron fluoride etherate ($BF_3 \cdot Et_2O$) and 50 ml. 1-butanol were placed in the flask. The reaction temperature was 118° C. The yield of dihydrofuran was 1.38 grams or 13.8%.

EXAMPLE 3

The procedure of Example 2 was repeated using 5.0 grams of $HgSO_4$ at about 118° C. The yield was 2.0 grams or 20% of DHF.

EXAMPLE 4

Using the same apparatus and procedure as in Example 1, 10 grams of 3,4-epoxy-1-butene, 1.5 grams $HgSO_4$, 2 ml. 6 N $H_2SO_4$ and 50 ml. 1-butanol were placed in the flask. The reaction temperature was 118° C. and gave a yield of 1.38 grams or 13.8% of DHF.

EXAMPLE 5

The procedure of Example 4 was repeated using 2.0 grams of $HgSO_4$ and 20 ml. of 1 N $H_2SO_4$, and 30 ml. of water as the solvent. The reaction temperature was 100° C. The yield of DHF was 3.3 grams or 33%.

EXAMPLE 6

The procedure of Example 1 was repeated using 10 grams of 3,4-dihydroxy-1-butene, 2.0 grams of $HgSO_4$, 3 drops of $H_2SO_4$ and 50 ml. of water. The reaction temperature was about 100° C. The yield of DHF was 2.29 grams or 29%.

EXAMPLE 7

Example 2 was repeated with the mercury salt omitted. No dihydrofuran was produced.

EXAMPLE 8

The procedure of Example 1 was repeated but at 25° C. for almost 48 hours. The yield of DHF was about 35 mole percent.

EXAMPLE 9

The procedure of Example 1 was repeated but at 70° C. for 2 hours. The yield of DHF was about 35 mole percent.

The invention claimed is:

1. A process for the preparation of 2,5-dihydrofuran comprising contacting a starting material of 3,4-epoxy-1-butene, 3,4-dihydroxy-1-butene, 1,4-dihydroxy-2-butene or mixtures thereof with a soluble mercury salt selected from the group consisting of mercury (II) sulfate, mercury (II) chloride, mercury (I) acetate, mercury (II) acetate, mercury (II) nitrate, mercury (I) chlorate, mercury (I) chromate, mercury (II) chromate, and mercury (II) fulminate in a non-basic hydroxylic solvent in liquid phase at a temperature in the range of 5 to 150° C., said solvent being a member selected from the group consisting of water, an organic compound of from 1 to 20 carbon atoms selected from the group consisting of alcohols, ether alcohols and acids, or mixtures thereof.

2. The process according to claim 1 wherein the temperature is in the range of 20 to 110° C.

3. The process according to claim 2 wherein there is about 1 to 70 weight percent of mercury salt based on the starting material.

4. The process according to claim 3 wherein there is about 10 to 50 weight percent mercury salt.

5. The process according to claim 1 wherein the non-basic hydroxylic solvent is selected from the group consisting of water, methanol, ethanol, butanol, propanol, hexanol, ethylene glycol, glycerol, propylene glycol, pentaerythritol, xylitol, sorbitol, diethylene glycol, dipropylene glycol, ethylene propylene glycol, acetic acid, propionic acid, and benzoic acid or mixtures thereof.

6. The process according to claim 5 wherein the solvent comprises water, methanol, ethanol, butanol, ethylene glycol, propylene glycol or mixtures thereof.

7. The process according to claim 6 wherein the pH of the solvent is about 0 to 7.

8. The process according to claim 7 wherein the pH of the solvent is less than 7.

9. The process according to claim 8 wherein the solvent is water.

10. The process according to claim 6 wherein there is about 1 to 70 weight percent mercury (II) sulfate based on the starting material.

11. The process according to claim 10 wherein the pH of the solvent is less than 7.

12. The process according to claim 11 wherein the starting material comprises 3,4-epoxy-1-butene and the solvent is a lower mono hydroxy alcohol.

13. The process according to claim 11 wherein the starting material comprises 3,4-epoxy-1-butene and the solvent is water.

14. The process according to claim 11 wherein the starting material comprises 3,4-dihydroxy-1-butene and the solvent is water.

15. The process according to claim 10 wherein the starting material is 3,4-dihydroxy-1-butene and the solvent is water.

References Cited

UNITED STATES PATENTS

| | | | |
|---|---|---|---|
| 3,165,536 | 1/1965 | Strohmeyer | 260—346.1 R |

FOREIGN PATENTS

| | | |
|---|---|---|
| 794,685 | 5/1958 | Great Britain. |
| 510,949 | 8/1939 | Great Britain. |
| 510,615 | 8/1939 | Great Britain. |
| 1,555,860 | 1/1969 | France. |

OTHER REFERENCES

Reppe: Chem. Ab. (1956), 16773–16777.

JOHN D. RANDOLPH, Primary Examiner

B. DENTZ, Assistant Examiner